March 12, 1968  J. LAWRENSON ETAL  3,373,008
PROTECTING SLIPPER FOR AN EDGE ROLLER
IN A GLASS SHEET SUPPORT BATH
Filed March 22, 1965  2 Sheets-Sheet 1

Jack Lawrenson and
Frederick William Silverwood
Inventors

By
Morrison, Kennedy & Campbell
Attorneys

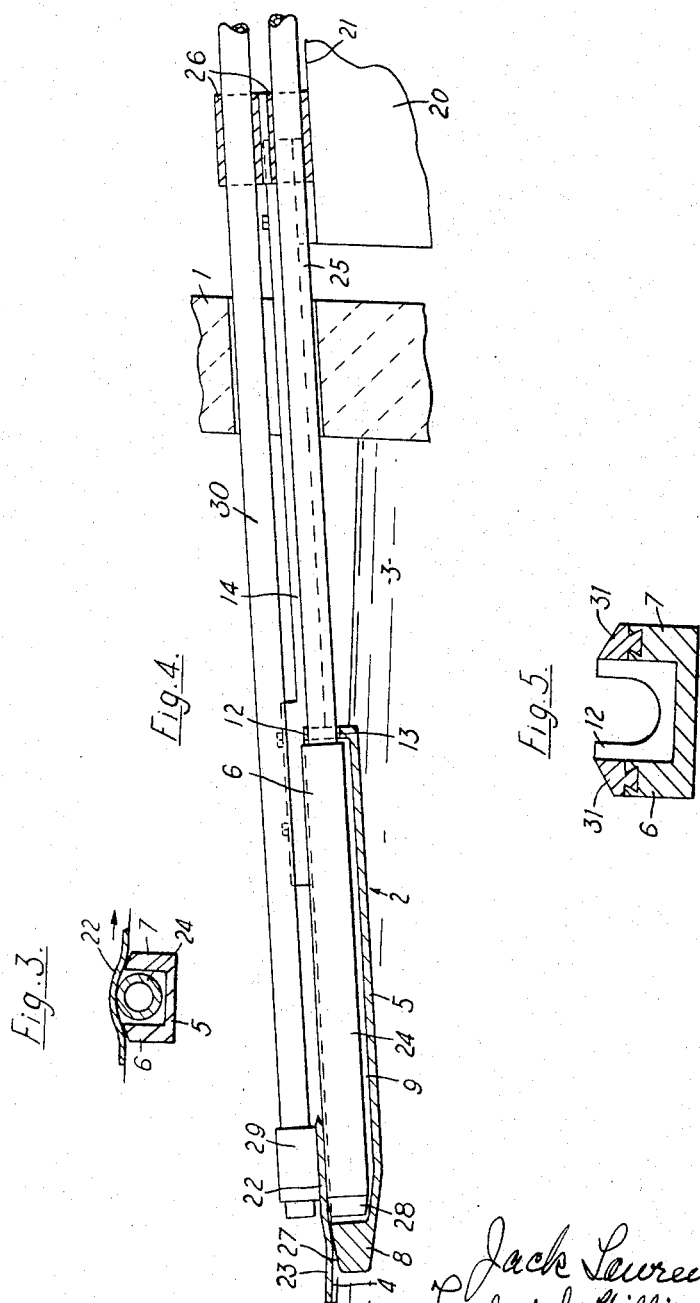

United States Patent Office 3,373,008
Patented Mar. 12, 1968

3,373,008
PROTECTING SLIPPER FOR AN EDGE ROLLER IN A GLASS SHEET SUPPORT BATH
Jack Lawrenson, St. Helens, and Frederick William Silverwood, Appley Bridge, England, assignors to Pilkington Brothers Limited, Liverpool, England, a corporation of Great Britain
Filed Mar. 22, 1965, Ser. No. 441,427
Claims priority, application Great Britain, Mar. 25, 1964, 12,711/64
7 Claims. (Cl. 65—182)

ABSTRACT OF THE DISCLOSURE

An edge roll for engaging under a margin of a ribbon of glass being advanced along a bath of molten metal is mounted in an open-topped protecting slipper which is partially submerged in the bath.

---

Figure 1:
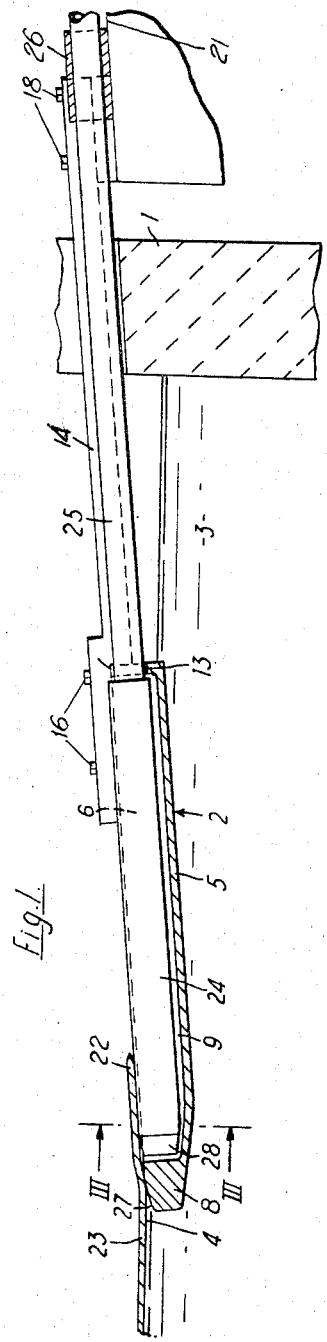

This invention relates to the manufacture of flat glass and in particular to apparatus for use in the manufacture of flat glass during which glass in ribbon form is advanced along a bath of molten metal contained in a tank structure.

In some methods of manufacturing flat glass in ribbon form on a bath of molten metal the margins of the ribbon of glass are engaged by edge rolls as the ribbon is advanced along the bath. For example the margins of the ribbon of glass may be engaged by edge rolls in order to control the width of the ribbon of glass as its thickness is progressively decreased by the action of longitudinally applied tractive force. In another method a ribbon of glass is advanced along a bath of molten metal and is stiffened sufficiently to be capable of being gripped between pairs of edge rolls prior to attenuation of the ribbon by longitudinally applied tractive force.

Edge rolls which are in contact with the molten metal extract heat from the molten metal, and it is a main object of the present invention to provide an edge roll arrangement which reduces the extraction of heat from the molten metal by the edge rolls.

Another object of the invention is to enable edge rolls to be used in locations in the bath at higher temperatures than has been possible hitherto.

According to the invention apparatus for use in the manufacture of flat glass during which glass in ribbon form is advanced along a bath of molten metal contained in a tank structure, comprises a trough-shaped slipper mounted relative to the tank structure and held partially submerged in the molten metal, and an edge roll projecting through the tank side wall into the trough in the slipper so that the top surface of the edge roll lies above the top edge of the slipper and can engage under a margin of a ribbon of glass advanced along the bath, while the slipper preserves the edge roll from contact with the molten metal bath.

Preferably the slipper is held sloping downwardly into the bath. The underface of the margin of the ribbon of glass is thus engaged by the edge roll and the ribbon margin is lifted off the bath surface by the edge roll.

The slipper is made of a material which is resistant to attack by the molten metal of the bath and preferably the slipper is made of carbon, which is not wetted by molten glass. Alternatively the slipper may be made of a refractory material and has carbon inserts in its top edges for engagement by the glass.

Further according to the invention the edge roll may be made of spheroidal graphite cast iron, mild steel or stainless steel.

In a method of manufacturing flat glass during which a ribbon of glass is advanced along a bath of molten metal the engaging of edge rolls mounted in slippers according to the invention under the margins of the ribbon may provide sufficient control of the ribbon, but an upper edge roll may be mounted through the tank side wall above the said edge roll located in the slipper in order to cooperate with the roll in the slipper to grip the margin of the ribbon of glass between the two edge rolls.

The invention also comprehends, for use in conjunction with an edge roll in apparatus for the manufacture of flat glass during which flat glass in ribbon form is advanced along a bath of molten metal, a trough-shaped slipper adapted to provide an enclosure for an edge roll, the surfaces of the upper edges of which slipper are non-wettable by molten glass.

Figure 2:
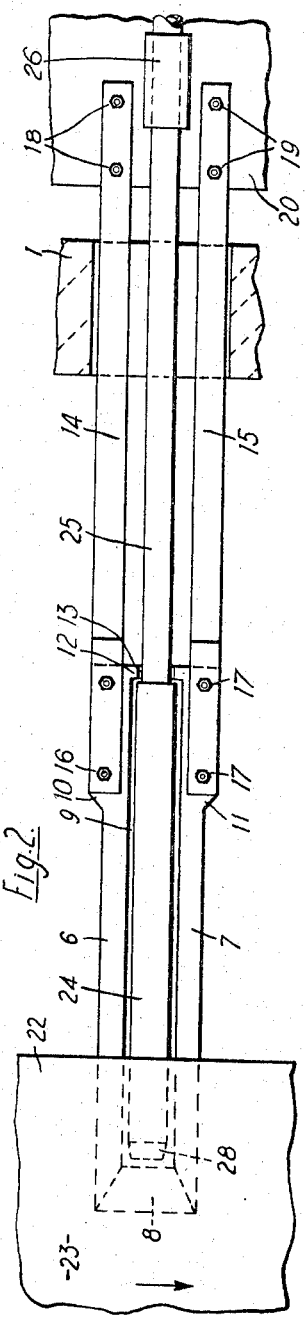

In order that the invention may be more clearly understood some embodiments thereof will now be described by way of example, with reference to the accompanying drawings, in which:

FIGURE 1 is an elevation partly in section of an edge roll located in a slipper according to the invention, which slipper is held partially submerged in a bath of molten metal along which a ribbon of glass is advanced, FIGURE 2 is a plan view of the edge roll and slipper of FIGURE 1, FIGURE 3 is a section on line III—III of FIGURE 1, FIGURE 4 illustrates the edge roll and slipper of FIGURES 1 to 3 used in conjunction with an upper edge roll for gripping the margin of a ribbon of glass, and FIGURE 5 is a view similar to FIGURE 3 showing a modified construction of a slipper according to the invention.

FIGURES 1 to 3 of the drawings illustrate an edge roll for engaging under a margin of a ribbon of flat glass as the ribbon is advanced along a bath of molten metal which is contained in a tank structure. The bath of molten metal is preferably so constituted as to have the characteristics fully described in U.S. Patent No. 2,911,759 and is for example a bath of molten tin or a molten tin alloy having a specific gravity greater than glass.

One side wall of the tank structure is indicated at 1 in FIGURE 1, and a trough-shaped slipper 2 which is made of a material which is resistant to attack by the metal of the bath and is non-wettable by molten glass, is so mounted relative to the tank structure that it dips downwardly at a slight angle into the molten metal 3 of the bath and is partially submerged in the molten metal. The level of the surface of the bath of molten metal is indicated at 4.

The slipper 2 comprises a base 5, integral side walls 6 and 7 and an integral inner end 8 which together define a central U-shaped trough 9 running through the slipper. The outer ends of the side walls 6 and 7 are enlarged as indicated at 10 and 11 for fixing the slipper to the side wall 1 of the tank structure. The outer end of the trough is defined by the outer end wall 12 of the slipper through which there is a channel 13.

Two cantilever members 14 and 15 are respectively fixed to the enlarged outer ends 10 and 11 of the side walls 6 and 7, by bolts 16 and 17. The members 14 and 15 pass through the side wall 1 of the tank and are fixed by bolts 18 and 19 to a support block 20 whose upper surface 21 slopes downwardly at the desired angle of dip of the slipper 2 into the molten metal.

An edge roll projects through the side wall 1 of the tank structure at the same slight downward angle to the surface of the bath and, is in the embodiment described, parallel to the slipper 2. The edge roll is made of a heat resistant material for example spheroidal graphite cast iron, mild steel, stainless steel, and the end of the edge roll which engages under the margin 22 of the ribbon 23 of glass is in the form of a barrel 24 of greater diameter than that part of the shank 25 of the edge roll which extends through the side wall 1 of the tank structure. The shank 25 is mounted in a bearing block 26 which is fixed to the surface 21 of the support block 20. The barrel 24 and shank 25 are hollow so that the edge roll can be water cooled.

The barrel 24 of the roll is located in the U-shaped trough 9 with a clearance between the barrel 24 and the walls and floor of the trough, and the shank 25 of the edge roll passes through the channel 13 in the outer end wall of the slipper. The top surface of the barrel 24 of the edge roll lies just above the level of the top edges of the side walls 6 and 7 of the slipper so that a margin 22 of the ribbon of glass 23 which is being advanced along the bath of molten metal is lifted off the surface of the molten metal by the edge roll, without disturbing the flat main body 23 of the ribbon which is supported on the flat surface of the bath 3.

The top surface of the inner end 8 of the slipper is sloped downwardly as indicated at 27 and the end of the roll barrel 24 is shaped conically as indicated at 28.

The side walls 6 and 7 of the slipper also slope downwardly and as shown in FIGURE 3, this shaping of the top of the side walls of the slipper facilitates the supporting of the margin 22 of the ribbon of glass by the edge roll 24.

Thus the slipper 2 preserves the edge roll from contact with the molten metal 3 of the bath, while the edge roll engages the margin 22 of the ribbon of glass and can be used either alone, or, as shown in FIGURE 4, in conjunction with a second edge roll mounted through the tank side wall 1 in the headspace over the bath. The second edge roll has a short barrel 29 and a shank 30 which is mounted in the bearing block 26, and the margin 22 of the ribbon of glass is gripped between the barrels 24 and 29 of the edge rolls. The axes of the edge rolls are parallel.

Because the edge roll 24 is not in contact with the molten metal its barrel can be water-cooled without cooling the molten metal to any marked degree. This makes it possible to use edge rolls much nearer to the inlet end of the bath than has been possible hitherto. For example it is possible by the use of the invention to engage the margins of the ribbon of glass with edge rolls at locations in the bath where the temperature of the ribbon of glass is in the region of 900° C.

The slipper 2 described with reference to FIGURES 1 to 4 is an integral carbon slipper, but, as shown in FIGURE 5, the slipper may be made of a refractory material with carbon inserts 31 dovetailed into the top edges of the side walls 6 and 7 of refractory material.

Although only a single edge roll and its associated slipper has been described and illustrated in the present specification it will be understood that normally there would be oppositely disposed edge rolls engaging the margins of the ribbon of glass. As described above with reference to FIGURE 4, for some applications each edge roll may have an associated upper edge roll to form an edge roll pair between which the margin of the ribbon of glass is gripped.

Edge rolls with associated slippers according to the invention, may be employed as a series of edge rolls extending down the bath to engage the margins of the ribbon of glass at a succession of oppositely disposed locations down the bath. In all these applications the edge rolls may be driven or free running.

Thus the invention provides an improved apparatus for the manufacture of flat glass in ribbon form on a bath of molten metal which, by preserving edge rolls from contact with the molten metal, enables edge rolls to be used to engage the undersurface of the margins of the ribbon of glass in such a way that the extraction of heat from the bath by the edge rolls is minimised, and edge rolls can be used at hotter parts of the bath than has been possible hitherto.

We claim:
1. Apparatus for use in the manufacture of flat glass during which glass in ribbon form is advanced along a bath of molten metal contained in a tank structure, comprising a trough-shaped slipper mounted relative to the tank structure and held partially submerged in the molten metal, and an edge roll projecting through the tank side wall into the trough in the slipper so that the top surface of the edge roll lies above the top edge of the slipper and can engage under a margin of a ribbon of glass advanced along the bath, while the slipper preserves the edge roll from contact with the molten metal bath.

2. Apparatus according to claim 1, wherein the slipper is held sloping downwardly into the bath.

3. Apparatus according to claim 1, wherein the slipper is made of carbon.

4. Apparatus according to claim 1, wherein the slipper is made of a refractory material and has carbon inserts in its top edges for engagement by the glass.

5. Apparatus according to claim 1, wherein the edge roll is made of spheroidal graphite cast iron, mild steel or stainless steel.

6. Apparatus according to claim 1, including an upper edge roll mounted through the tank side wall above the edge roll located in the slipper in order to co-operate with the edge roll in the slipper to grip the margin of a ribbon of glass between the two edge rolls.

7. Apparatus for use in the manufacture of flat glass comprising the combination with a tank structure containing a bath of molten metal and means for delivering glass to the bath and advancing the glass in ribbon form along the bath, of a protecting slipper partially submerged within the molten metal bath and having an open upper portion within which there is mounted an edge roll for engaging under a margin of the ribbon of glass.

References Cited
UNITED STATES PATENTS 1,639,453   8/1927   Ferngren _____ 65—199

S. LEON BASHORE, *Acting Primary Examiner.*

ARTHUR D. KELLOGG, *Examiner.*